Sept. 13, 1949.    W. J. BEVAN    2,481,898
FRONT END HOIST FOR SEMITRAILERS
Filed June 6, 1946    2 Sheets-Sheet 1
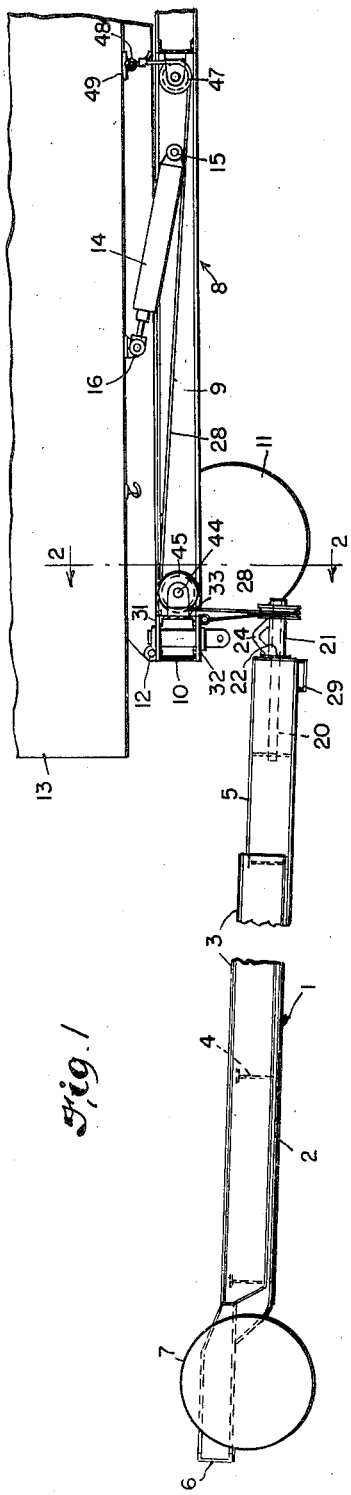
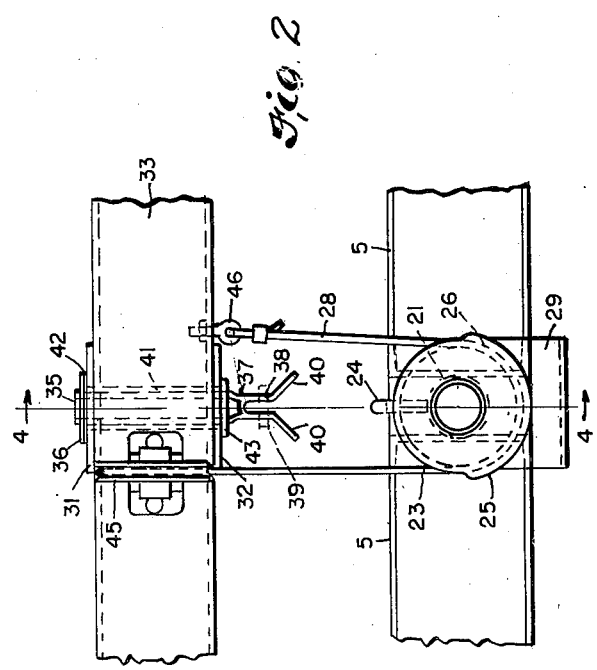
INVENTOR.
WILLIAM J. BEVAN
BY
Oberlin & Limbach
ATTORNEYS

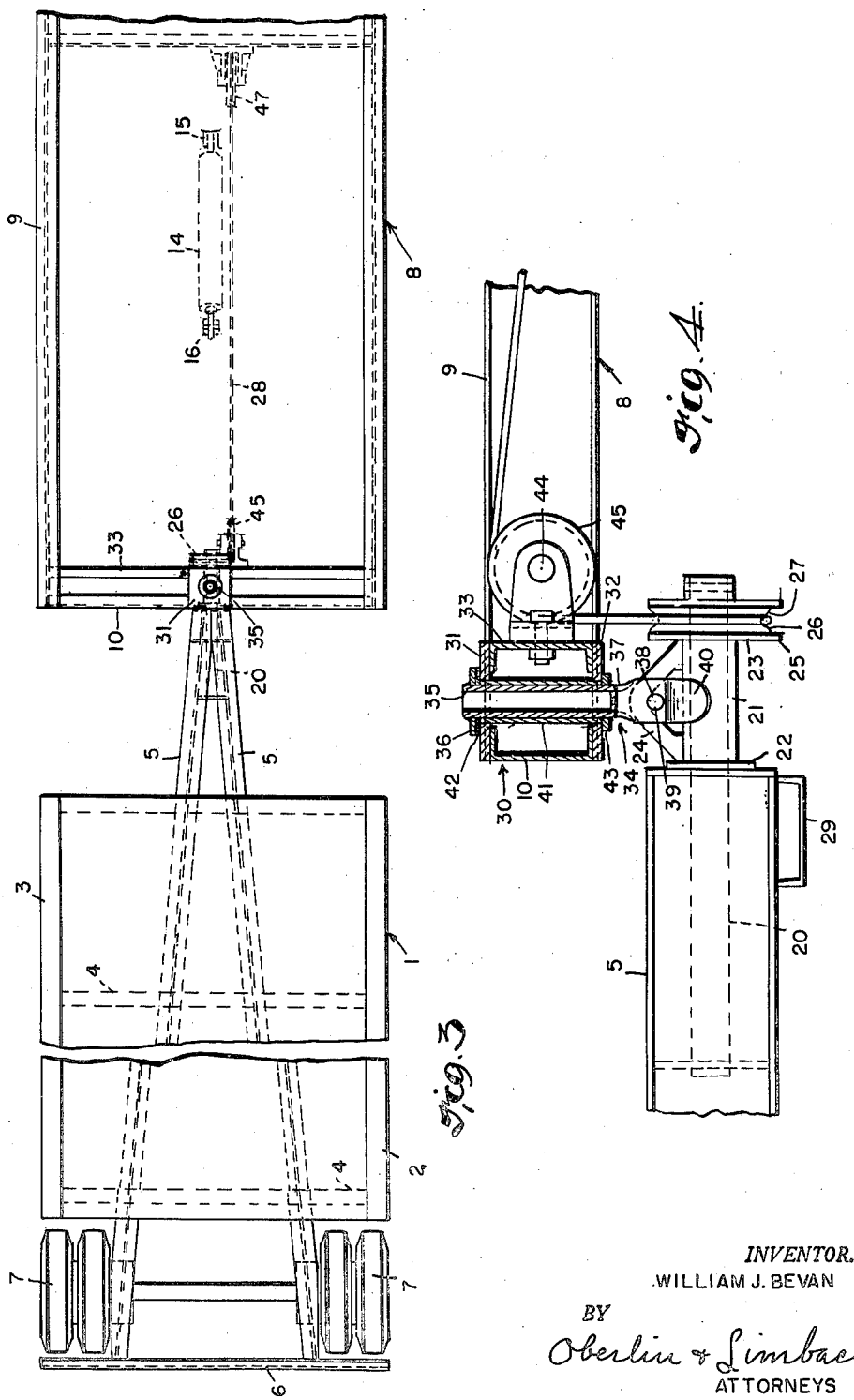

Patented Sept. 13, 1949

2,481,898

UNITED STATES PATENT OFFICE 2,481,898

FRONT END HOIST FOR SEMITRAILERS

William J. Bevan, East McKeesport, Pa., assignor to Rogers Brothers Corporation, Albion, Pa., a corporation of Pennsylvania Application June 6, 1946, Serial No. 674,809

18 Claims. (Cl. 280—33.44)

This invention relates to semi-trailers and to semi-trailer and tractor combinations, and particularly to a new and improved mechanism for hoisting the front end of the semi-trailer and coupling it to the rear of a tractor.

One of the principal objects of the present invention is to provide a combined coupling and hoist mechanism including a coupling member which is carried on the semi-trailer and is adapted to be connected to a complementary coupling member on the rear end of a tractor, and a hoist operated member carried on the trailer and which is operative upon operation of cooperating hoist means carried on the tractor to lift the front end of the semi-trailer and move it so that its coupling member is brought into alignment and final position with respect to the complementary coupling member on the tractor.

Another object is to provide a combined coupling and hoist mechanism of the character described which is further operative upon operation of the hoist, with the brakes of the tractor or trailer, or both, released, to effect concurrently relative longitudinal movement of the tractor and semi-trailer and swinging movement of the forward end of the semi-trailer laterally of the truck so as automatically to bring the coupling members into vertical alignment and concurrently hoist the front end of the semi-trailer to dispose the coupling members in proper position for coupling.

Another object is to provide in a semi-trailer and dump truck combination a hoist which includes a cable which is guided and directed for effecting the proper concurrent hoisting of the front end of the trailer and alignment of the coupling members upon tensioning of the cable and in which the tension of the cable is applied by hooking it to the dump truck body at an elevatable portion thereof so as to use the hoisting means of the body for operation of the hoist and coupling mechanism.

Another object is to accomplish this result by a simple hoist mechanism which can be readily installed and in which a mechanical advantage is derived so that a hoisting means of limited power, such as is usually provided for the dumping of a body, is effective for lifting the front end of a heavily loaded semi-trailer.

Another object is to greatly reduce the time and the number of men required for loading and coupling a semi-trailer to a tractor and to reduce the dangers to operators normally attendant upon such an operation.

Other objects and advantages will become apparent from the following description wherein reference is made to the drawings, in which:

Fig. 1 is a longitudinal view of a semi-trailer and the rear portion of a dump truck, illustrating the hoist and coupling mechanism of the present invention, part thereof being shown in section for clearness in illustration;

Fig. 2 is a rear elevation of the truck, and the hoist and coupling members of the trailer, and is taken on line 2—2 of Fig. 1;

Fig. 3 is a fragmentary top plan view of the semi-trailer illustrated in Fig. 1 and the rear portion of the dump truck associated therewith, the dump truck body being omitted for clearness in illustration; and Fig. 4 is an enlarged longitudinal sectional view of the coupling means and is taken on a line 4—4 of Fig. 2.

Referring to the drawings, the semi-trailer, indicated generally at 1, comprises a wooden platform 2, supported on the usual longitudinal frame members 3 and transverse frame members 4 and forwardly extending diagonal frame members 5, the trailer frame, in turn, being supported on the usual axle 6 on which are mounted dual wheels 7. The trailer above described is, of itself, old in the art.

The dump truck is indicated generally at 8, and comprises a chassis having longitudinal frame members 9 and a rear transverse frame member 10, the chassis being carried, through the medium of the usual spring suspension, on the wheels 11. On top of the chassis is mounted a transverse rock shaft 12 on which is pivotally supported a dump body 13, the rock shaft 12 being arranged at the rear end portion of the truck and the body being arranged to be lifted at its forward end and rocked about the shaft 12 for dumping. As a hoisting means for the body, the usual compressed fluid operated piston type hoist 14 is shown, the cylinder thereof being pivotally connected to the chassis, as indicated at 15, and the piston rod being pivotally connected to a suitable transverse frame member of the body, as indicated at 16.

The dump truck above described is also, of itself, old in the art.

In order to embody the present invention in a truck and trailer combination, such as described, a longitudinal shaft 20 is securely mounted on the front portion of the trailer, preferably by welding it in place between the diagonal frame members 5 so that it extends along the longitudinal center line of the trailer and projects forwardly beyond the front end of the diagonal frame members 5.

To permit free lateral oscillation of the trailer so that it may adjust itself to road irregularities when it is connected to the truck, the coupling member on the trailer comprises a sleeve 21 which is mounted for rocking movement on the shaft 20 and is provided with suitable end flanges 22 and 23 which are preferably concentric with the sleeve 21. Mounted on, or integral with, the sleeve 21 is a suitable coupling member 24, such as an eye, which, in normal position, extends upwardly from the sleeve and is exposed at the top so it can be lifted vertically into engagement with a complementary coupling member on the truck, later to be described. In order to maintain the coupling member 24 yieldably in upright position, one of the flanges, such as the flange 23, is provided with an enlarged portion 25 diametrically opposite from the coupling member 24 and of sufficient weight normally to rock the sleeve 21 into a position in which the coupling member is upright after the flange 23 is lifted clear of the ground.

The hoisting member on the semi-trailer may comprise a sheave 26 which is rotatably mounted on the shaft 20 and has a relatively deep circumferential groove 27 for accommodating a cable 28. It should be noted that the periphery of the sheave 26 preferably is unobstructed sufficiently at the bottom and forward portion so that the bight of a cable, dependant from a point above the trailer, can be moved endwise of the sheave so as to dispose the base of the bight on the underside of the sheave. A shoe 29 is provided on the underside of the longitudinal frame members 5 to hold the sheave 26 clear of the ground a sufficient distance for this operation.

For cooperation with the coupling and hoist structure described, there is provided a suitable frame which is adapted to be connected to the rear end portion of the truck chassis and which carries cooperating hoist and coupling structure. In the form illustrated, such a frame, indicated generally at 30, comprises an upper plate 31 and lower plate 32 fixedly secured to a suitable angle iron 33. The frame 30 extends transversely of the truck chassis and may be fixedly connected thereto between the longitudinal frame members 9 and in overlying and underlying relation to the transverse frame member 10 as illustrated. The frame may be secured in place by welding or otherwise.

Carried by the frame and preferably on the longitudinal center line of the truck is a coupling member 34 which, as better illustrated in Fig. 4, may comprise an upright hollow tube 35 having a suitable bearing collar 36 secured thereto in coaxial relation therewith at its upper end. The lower end of the tube is in the form of a yoke 37 having aligned openings 38 therethrough which accommodate a coupling pin 39. The yoke is open downwardly and has outwardly and downwardly flaring end portions 40 for initially receiving the complementary coupling member 24 of the trailer and guiding it into final position for coupling by the pin 39. The coupling member 34 is preferably supported in the frame in upright position and with the yoke 37 depending therefrom for rotation about an upright axis. For this purpose, a suitable sleeve 41 is secured, by welding or otherwise, between the frame members 31 and 32 and the coupling member 34 extends therethrough, a suitable bearing washer 42 being interposed between the flange 36 and the frame member 31. A retaining collar 43 is secured on the coupling member 34 and bears against the underside of the frame member 32 so as to prevent upward axial displacement of the coupling member. The yoke 37 is thus mounted for rotation about its upright axis. It and the eye 24 provide complementary fifth wheel members which, when in coupled relation, permit transverse rocking of the semi-trailer as well as swinging of the trailer to different angular positions about the axis of the tube 35.

Mounted on the frame 30 is a transverse stub shaft 44 on which a sheave 45 is rotatably mounted. An anchor 46, which may be an eye-bolt or other suitable cable fastening device, is mounted in the frame 30 in spaced relation to the sheave 45. The sheave 45 and anchor 46 are preferably disposed equidistantly at opposite sides of the coupling member 34 transversely of the frame 31 or truck and are positioned longitudinally thereof so that when the cable 28 is connected at one end to the anchor 46 and is passed over the sheave 45, the bight of the cable is free and depends from the frame with its longitudinal axis intersecting the vertical axis of the yoke 37.

The bight of the cable may be slackened and pulled out of its normal free swinging position and placed over the sheave 26. The cable is arranged to be tensioned for reducing the bight. This preferably is accomplished by passing it over an additional sheave 47 which is mounted on a transverse shaft on the chassis of the truck beneath the forward portion of the dump body and then leading it upwardly to a suitable anchor 48 mounted on a transverse frame member 49 of the dump body.

With the structure described, upon tensioning of the cable by hoisting of the dump truck body, the bight of the cable is gradually shortened.

With the brakes of either the truck or semi-trailer or both released, shortening of the bight concurrently swings the forward end of the trailer toward the longitudinal center line of the truck and pulls the truck and trailer relatively together longitudinally, until the sheave is freely cradled in the bight. When the sheave is freely cradled in a free swinging bight of the cable, continued tensioning of the cable hoists the front end of the trailer and swings it laterally of the truck. The anchor 46 and sheave 45 are so positioned longitudinally and laterally of the truck relative to the complementary coupling member 34 and the coupling member 24 of the trailer is so positioned relative to the sheave 26, that when the sheave 26 is cradled in the bight and the forward end of the trailer hoisted thereby, the coupling member 24 is moved into alignment vertically beneath the coupling member 34 and into the open end of the yoke 37 into the proper position for inserting the pin 39. As mentioned the anchor 46 and sheave 45 are spaced equidistantly on opposite sides of the connecting member 34 and somewhat forwardly thereof, but they may be otherwise disposed, depending upon the relative positions of the sheave 26 and the eye 24.

Thus, for loading the trailer, the front end of the diagonal frame members 5 is dropped to the ground and the desired load moved onto the platform from the forward end of the trailer. This is relatively easy of accomplishment inasmuch as the forward end of the platform is then a very limited distance above the ground. After loading it is only necessary to back the truck approximately into place, loosen the cable and lower the bight around the sheave 26 and then hook the forward end of the cable to the underside of the dump body and operate the dump body, thus hoisting the front end of the semi-trailer and automatically and concurrently bringing the coupling members into proper relation so that the pin can be inserted to effect the final couple.

Obviously, if automatic coupling members are used so that the pin is unnecessary, the mere hoisting of the members into final position results in the completion of the couple.

Since all of these coupling operations, other than merely placing the bight of the cable under the sheave 26 while the front end of the trailer rests on the ground, and inserting the pin after the coupling members are held in coupling position, can be performed by the operator in the cab of the truck, only one man is necessary for coupling the truck and trailer. He can perform the operations with much greater safety than is usual in prior structures, wherein the front end of the trailer must be blocked up and the truck maneuvered carefully by one operator into position to engage the coupling members, while another operator directs the former by voice and then manages to insert the pin under such hazardous conditions.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a semi-trailer and dump truck, a dump body on the truck, power means to elevate the body for dumping, and complementary coupling members on the truck and trailer, respectively, of cooperable means on the truck and trailer, respectively and spaced from the complementary coupling members respectively, and actuated by elevating of the body and operative when so actuated concurrently to elevate the forward portion of the trailer, to move the truck and trailer relative to each other and to move the coupling members into coupling position, and means independent of the cooperable means to latch the coupling members together in coupling position.

2. A combination according to claim 1 wherein said cooperable means comprises a flexible cable connected to the body at an elevatable portion thereof, and operatively connected to the forward end of the trailer, a sheave means on the truck for guiding the cable.

3. In combination, a dump truck having a dump body, power means for elevating the body for dumping, a cable connected to an elevatable portion of the body, means on the truck for guiding the cable and supporting the cable with a bight dependent from the rear portion of the truck, a semi-trailer, complementary coupling means on the truck and semi-trailer respectively, connecting means on the semi-trailer and spaced from the coupling means thereon and cradled in said bight and movable thereby, upon movement of the dump body, and said connecting means, coupling means and guide means being positioned relative to each other so that reduction of the bight moves the coupling means into operative position with respect to each other, and means independent of the cable to latch the coupling means in said operative position.

4. In combination, a truck, a cable, guide means guiding the cable rearwardly and supporting the cable with a bight dependent from the rear portion of the truck with its longitudinal axis below the transverse center of the truck, a shaft on the forward portion of the trailer and extending longitudinally of the trailer at the transverse center of the trailer, a sheave on the shaft adapted to be cradled in the bight, a fifth wheel member dependent from the rear portion of the truck at the transverse center of the truck, and a complementary fifth wheel member on and rockable about said shaft, and power means on the truck operable to take up on the cable.

5. In combination, a dump truck having a dump body, power means for elevating the body for dumping, a cable connectible at one end to an elevatable portion of the dump body and anchored at the other end to the truck, guide means for the cable and including a member at the rear portion of the truck over which the cable passes and depends to form a bight between the member and anchored end of the cable, a semi-trailer having a forward portion, a cable engaging sheave member on said forward portion and cradled in said bight, whereby the forward portion of the trailer is raised and lowered by raising and lowering the body, and complementary coupling means on the truck and trailer so positioned relative to said members, respectively, as to be moved and guided into coupling position by the change in the bight occasioned by elevating the body.

6. The combination according to claim 5, further characterized in that the coupling means on the truck is disposed laterally of the truck between the lateral limits of the bight.

7. In a semi-trailer, a coupling member carried on the forward portion of the trailer, a horizontal shaft on the forward portion of the trailer near to the member, a sheave rotatable on the shaft and spaced from the member and adapted for cradling in the bight of a cable dependent from a level above the shaft, said coupling member being accessible from above for receiving a complementary coupling member in coupling position when said forward portion of the trailer is lifted, and means independent of the sheave and cable and connectable to the coupling member on the trailer and adapted, when so connected, to latch the coupling member on the trailer to the complementary coupling member when the latter is in coupling position.

8. In a semi-trailer, a shaft carried on the forward portion of the trailer and extending longitudinally thereof, a sleeve rockable on said shaft, a connecting member on the sleeve, and a sheave rotatably mounted on the shaft adjacent the sleeve.

9. In a semi-trailer, a forwardly extending tongue thereon, a coupling member carried by the tongue and adapted to receive a complementary coupling member in coupling position from above when the tongue of the trailer is lifted, a generally horizontal shaft on the tongue, a sheave rotatable on the shaft and spaced from the coupling member of the tongue and adapted to be cradled in the bight of a cable depending from a level above the sheave, means independent of the sheave and cable and connectable to the coupling member of the tongue and adapted, when so connected, to latch the coupling member of the tongue to the complementary coupling member, and the axis of the sheave being below the level of the last mentioned means when the last mentioned means is connected to the coupling member of the tongue.

10. In a semi-trailer, a forwardly extending tongue thereon, a coupling member carried by the tongue and adapted to receive a complementary coupling member in coupling position from above when the tongue of the trailer is lifted, a generally horizontal shaft on the tongue, and a sheave rotatable on the shaft and having its periphery unobstructed for receiving, endwise of the shaft, the bight of a cable in cradling relation to the sheave, and means independent of the cable and sheave and receivable in the coupling member of the tongue and adapted, when so received, to latch the coupling member of the tongue to the complementary coupling member.

11. In combination, a frame adapted for connection to the rear portion of a truck, means carried by the frame and including a sheave and operable to support a cable with a bight depending therefrom and to guide the cable when the frame is connected to a truck, a coupling member carried by the frame, a semi-trailer, a complementary coupling member carried thereby, and connecting means on the semi-trailer spaced from the said complementary coupling member and adapted to be cradled in the bight of the cable when the cable is so supported and guided, and said coupling members and means being positioned relative to each other so that when the bight of a cable so supported and guided, occasioned by tensioning the cable, is reduced with the connecting means cradled therein the coupling members will be brought into coupling position, and means independent of the cable to latch the coupling members together in coupling position.

12. In combination, a frame adapted for connection to a rear portion of a truck, means carried by the frame and operable to support a cable with a bight depending therefrom and to guide the cable when the frame is connected to a truck, a cable supported by said means, a coupling member carried by the frame, a semi-trailer, a complementary coupling member carried thereby, connecting means on the semi-trailer adapted to be cradled in the bight, and said coupling members and means being positioned relative to each other so that when the bight of the cable is reduced, with the connecting means cradled therein, by tensioning of the cable, the coupling members will be brought into coupling position, and means independent of the cable to latch the coupling members together in coupling position.

13. In combination, a semi-trailer having a forwardly extending tongue portion, a coupling member carried by the tongue portion, complementary coupling member, the coupling member on the tongue portion being accessible for engagement from above by the complementary coupling member, bearing means coaxial with and rotatably supporting the complementary coupling member for rotation about the axis, of the bearing means, means on the bearing means and adapted for connection to the rear portion of a truck so as to support the bearing means on the truck in depending relation with its axis vertically disposed, a sheave on said tongue portion and rotatable about a generally horizontal axis, a cable in cradling relation to the sheave, and means, adapted for connection to said truck so as to support and guide the cable with the bight in dependent relation relative to the complementary bearing member said coupling members, sheave and last mentioned means being positioned relative to each other so that when the bight of the cable is reduced with the sheave cradled therein, by tensioning the cable, the coupling members are brought into coupling relation, and means independent of the cable to latch the coupling members together in coupling position.

14. In combination, a truck, supporting means on the rear portion of the truck to guide and support a cable with a free swinging bight depending from said rear portion, a coupling member depending from said rear portion, a semi-trailer, a complementary coupling member carried on the forward portion thereof, connecting means on said forward portion of the semi-trailer and spaced from the complementary coupling member and cradled in said bight for lifting the forward end of the semi-trailer upon reduction of the bight by tensioning the cable, and said coupling members being aligned vertically when the connecting means are cradled in the bight with the bight depending vertically from said supporting means, and means independent of the cable for latching the coupling members in coupling position.

15. The combination with a semi-trailer and truck, a cable on the truck, power means for winding up and unwinding the cable, means on the truck for guiding the cable and supporting the cable with a bight dependent from the rear portion of the truck, a semi-trailer, a fifth wheel member on and dependent from the rear of the truck and open at the bottom to receive a complementary fifth wheel member on the trailer, a complementary fifth wheel member on the trailer and having an upstanding connecting portion receivable upwardly through the open bottom of the fifth wheel member on the truck, connecting means on the semi-trailer and spaced from the fifth wheel member thereon and adapted to be cradled in the bight of the cable and moved thereby upon winding and unwinding the cable, said connecting means including a sheave on the trailer and said connecting means, fifth wheel members and guide means being positioned relative to each other so that reduction of the bight moves the fifth wheel members into operative position with respect to each other, and means independent of the cable to latch the fifth wheel members in said operative position.

16. The combination according to claim 15 further characterized in that one of the fifth wheel members is rockable transversely and the other fifth wheel member is oscillatable about an upright axis.

17. The combination according to claim 15 further characterized in that one of the fifth wheel members is rockable transversely relative to the one of the vehicles on which it is carried and the other of the fifth wheel members is oscillatable about an upright axis relative to one of the vehicles.

18. In a semi-trailer, a shaft carried on the forward portion of the trailer and extending longitudinally thereof, a sleeve rockable on said shaft, a connecting member on the sleeve, a counter-balance rigid with the sleeve for maintaining the sleeve in a position wherein the connecting member is upright, and a sheave mounted on the forward portion of the trailer for rotation independently of the rocking of the sleeve.

WILLIAM J. BEVAN.

REFERENCES CITED

The following references are of record in the file of this patent:

UNITED STATES PATENTS

| Number | Name | Date |
| --- | --- | --- |
| 1,226,687 | Mowry | May 22, 1917 |
| 1,897,383 | Burgoyne | Feb. 14, 1933 |
| 1,924,235 | Fontaine | Aug. 29, 1933 |